(12) United States Patent
Kirchhoffer et al.

(10) Patent No.: US 11,325,500 B2
(45) Date of Patent: May 10, 2022

(54) ON-BOARD ELECTRICAL NETWORK FOR A MOTOR VEHICLE

(71) Applicant: Ford Global Technologies, LLC, Dearborn, MI (US)

(72) Inventors: Johann Kirchhoffer, Cologne (DE); Philip Stauss, Pulheim (DE); Christopher Chumchal, Cologne (DE); Sebastian Schneider, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 16/559,339

(22) Filed: Sep. 3, 2019

(65) Prior Publication Data
US 2020/0086762 A1    Mar. 19, 2020

(30) Foreign Application Priority Data
Sep. 13, 2018 (DE) .......................... 102018215605.0

(51) Int. Cl.
*B60L 58/20* (2019.01)
*B60L 50/61* (2019.01)

(52) U.S. Cl.
CPC ............... *B60L 58/20* (2019.02); *B60L 50/61* (2019.02); *B60L 2210/10* (2013.01); *B60L 2240/30* (2013.01); *B60L 2250/10* (2013.01); *B60L 2260/26* (2013.01)

(58) Field of Classification Search
CPC ...... B60L 58/20; B60L 50/61; B60L 2210/10; B60L 2240/30; B60L 2250/10; B60L 2260/26; B60L 2240/486; B60L 1/00; B60L 3/0023; B60L 3/0092; B60L 3/12; Y02T 10/62; Y02T 10/70; Y02T 10/72; B60R 16/03; B60R 16/02; B60W 50/02
USPC ....................................................... 320/104
See application file for complete search history.

(56) References Cited

U.S. PATENT DOCUMENTS

| | | | |
|---|---|---|---|
| 2009/0096410 A1* | 4/2009 | Sakurai | B60L 58/20 320/104 |
| 2010/0066302 A1* | 3/2010 | Gregg | B60L 58/20 320/104 |
| 2014/0217812 A1* | 8/2014 | Sugiyama | B60L 58/21 320/104 |

* cited by examiner

*Primary Examiner* — Paul Dinh
(74) *Attorney, Agent, or Firm* — Frank Lollo; Eversheds Sutherland (US) LLP

(57) ABSTRACT

The invention relates to a method for operating an on-board electrical network (4) of a motor vehicle (2), with a first voltage circuit (I) and a second voltage circuit (II), the first voltage circuit (I) having a first operating voltage which is higher than a second operating voltage in the second voltage circuit (II), the first voltage circuit (I) being connected to the second voltage circuit (II) via a DC-DC converter (8), and the first voltage circuit (I) having a battery (10) and the second voltage circuit (II) having a main battery (12), characterized in that the second voltage circuit (II) has an additional third auxiliary battery (14), and wherein by means of a changeover switch assembly (18) components of the motor vehicle (2) are supplied with electrical energy from the main battery (12) and/or the auxiliary battery (14), and in that the main battery (12) is disconnected from the second voltage circuit (II) by means of an isolating switch (66) during a startup mode.

21 Claims, 3 Drawing Sheets

Figure 1:
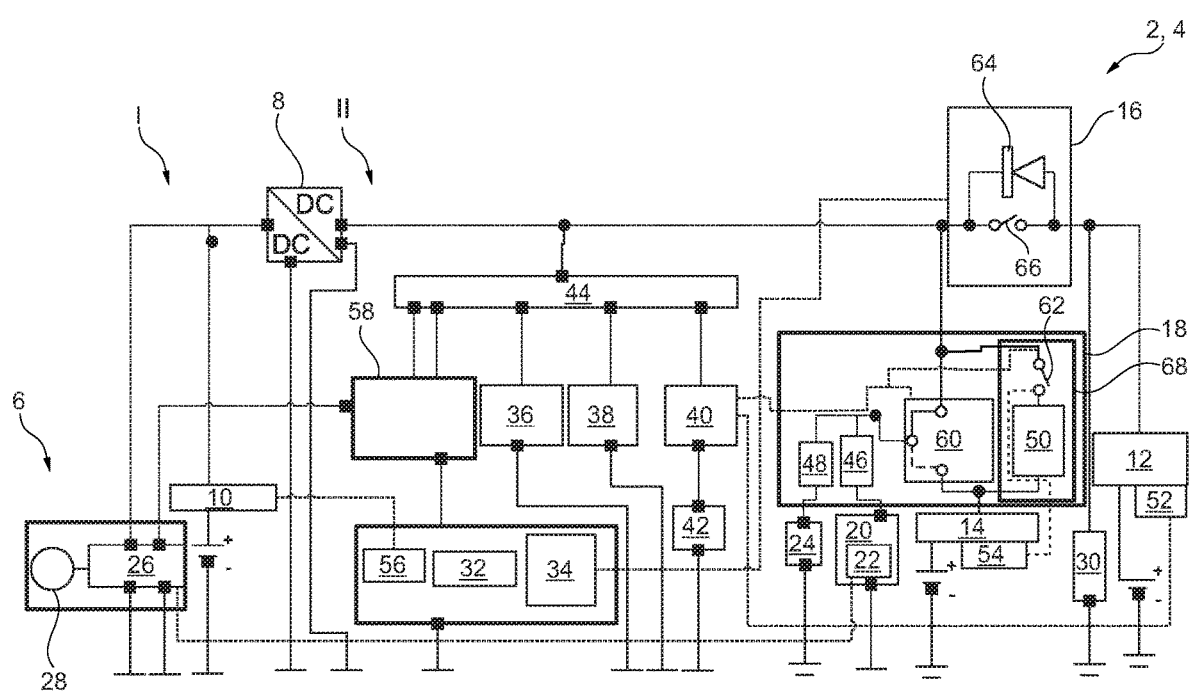

| Function verification matrix of changeover switch group 18 ||||||
|---|---|---|---|---|---|
| Pos. of changeover switch 60 | Position of isolating switch 62 | Voltage of auxiliary battery sensor 54 | Voltage of main battery sensor 52 | Voltage of transmission control unit 20 | For every MEASUREMENT: 1) V1=V1 2) V2=V2 This measured voltage is equal to the expected voltage value where V1= auxiliary battery voltage V2= main battery voltage |
| Direction of main battery 12 | open | V1 | V2 | V2 | |
| Direction of auxiliary batttery 14 | open | V1 | V2 | V1 | |
| Direction of auxiliary batttery 14 | closed | V2 | V2 | V2 | |
| Direction of main battery 12 | closed | V2 | V2 | V2 | |

Fig. 3

ON-BOARD ELECTRICAL NETWORK FOR A MOTOR VEHICLE

CROSS-REFERENCE TO RELATED APPLICATIONS

This application claims priority to and the benefit of German patent application No. 102018215605.0, filed Sep. 13, 2018, which is hereby incorporated by reference herein in its entirety.

The invention relates to an on-board electrical network for a motor vehicle.

An on-board electrical network is understood to mean the totality of all electrical components in a motor vehicle, such as a car.

A 12-Volt on-board electrical network can now barely cover the power consumption required by a modern motor vehicle for its comfort systems. The "static" consumers almost completely exhaust the alternator, which delivers up to 3 kW of power, especially at low temperatures. For additional dynamic consumers, such as powerful electrically driven compressors, the battery power is not sufficient. Therefore, a second partial on-board electrical network with a voltage of 48 Volts is added, which complements the 12-Volt onboard network.

An on-board electrical network with an operating voltage of 48 Volts also offers the possibility of implementing a simpler hybridization quickly and cost-effectively and of keeping harmful emissions below statutory limits by partial electrification of the powertrain of the motor vehicle.

The use of a 48-Volt on-board electrical network does not replace the previously known 12V on-board network but supplements it. Many established components in the motor vehicle can continue to be operated exclusively with a voltage of 12 Volts. Thus, a complete and therefore expensive conversion to higher electrical voltages can be avoided.

In operation a uni- or bidirectional DC-DC converter supplies the 12-Volt on-board network from the 48-Volt onboard network.

In the case of a motor vehicle in the form of a mild hybrid, the powertrain has an electric motor, such as a belt-driven starter generator (BiSG) or a transmission integrated motor generator (TiMG), an inverter, a DC voltage converter and a 48-Volt battery.

Hence a 48-Volt on-board electrical network can be used to operate an electric motor as a motor with up to 15 kW. However, this requires an engine restart under all driving conditions, even at low speeds.

In view of the engine start requirement and the need to decouple the main battery, a second battery is required in combination with a 12 V output of the DC/DC converter in order to stabilize the on-board supply voltage in particular when starting the internal combustion engine. However, given fluctuations in the operating temperature a 12-Volt output of the DC/DC converter cannot be regarded as stable.

Special requirements on operational safety are placed by Shift-by-Wire systems or Park-by-Wire systems, in which actuating signals are only transmitted electrically. Some system redundancy is therefore required, so that for example a motor vehicle can be safely parked with a parking system or an electric parking brake in the event of a given fault.

The 48-Volt battery can be a lithium-ion battery. Such lithium-ion batteries, however, do not deliver enough electrical current at low temperatures to start the engine. Therefore, a conventional starter is supplied with operating power from a 12-Volt lead-acid battery.

There is therefore a need to identify ways in which the operational security of such an on-board electrical network can be increased.

The object of the invention is achieved by a method for operating an on-board electrical network of a motor vehicle having a first voltage circuit and a second voltage circuit, the first voltage circuit having a first operating voltage which is higher than a second operating voltage in the second voltage circuit, the first voltage circuit being connected to the second voltage circuit via a DC-DC converter, and the first voltage circuit having a battery and the second voltage circuit having a main battery, characterized in that the second voltage circuit has an additional third auxiliary battery, and wherein by means of a changeover switch assembly, components of the motor vehicle are supplied with electrical energy from the main battery and/or the auxiliary battery, and in that the main battery is disconnected from the second voltage circuit by means of an isolating switch during a startup mode.

The on-board electrical network can thus be operated in a starting mode, in addition to a combustion power mode and a charging mode. In the combustion power mode, the internal combustion engine of the motor vehicle is running, i.e. it provides at least a partial contribution to the overall traction of the motor vehicle, while in charging mode energy stores, such as batteries, of the motor vehicle are charged with electrical energy. In the startup mode, by contrast, the internal combustion engine is started.

Thus, starting the internal combustion engine can be achieved following an electric driving mode, in particular at low speeds. Low speeds are speeds that can occur for example in city traffic. At the same time, voltage dropout is counteracted during the startup operation. Finally, the main battery and the auxiliary battery can be charged with the DC-to-DC converter.

A redundancy of the operational power supply is thus achieved in the second voltage circuit by means of the main battery and the auxiliary battery, since the supply of electrical energy using the DC-to-DC converter alone is not sufficiently stable.

According to one embodiment, one of the components is a transmission control unit and/or a gear-shift control unit (Shift-by-Wire and Park-by-Wire) and/or a transmission control unit with or without integrated hybrid control. A redundancy of the operational power supply for these control units can therefore be achieved. This counteracts malfunctions, for example of an electrically controlled parking lock/immobilizer in the transmission of a motor vehicle, which are controlled by the control unit for the gear shift (Shift-by-Wire and Park-by-Wire) and/or by a transmission control unit with or without integrated hybrid controller. The gear-shift control unit transforms the gear selection by a driver into a signal which is transmitted to the transmission control unit and executed by the transmission control unit, such as a mechanical parking lock/immobilizer of an automatic transmission.

According to a further embodiment one of the components is the ABS/EPB system. A redundancy of the operational power supply for the ABS/EPB system can therefore be achieved. This counteracts malfunctions e.g. of an electric parking brake of a motor vehicle which is activated by an EPB/ABS control unit. This ensures that if a fault occurs in one of the voltage circuits, the mechanical parking lock/immobilizer and/or an electric parking brake is/are still fully functional. A fault case error is understood here in the sense that a physical fault occurs in the voltage circuits. This fault case represents a masking of the subsequently occurring, potentially safety-critical fault until this first fault has been detected and resolved, and therefore the actual functions of a parking lock/immobilizer and/or an electric parking brake are fully functional during this process. This is referred to as redundancy.

Thus, according to a system requirement a redundancy of the operating power supply can be achieved for any desired control devices in order to counteract their safety-critical malfunctions.

According to a further embodiment, the DC/DC converter is supplied with electrical energy by means of an isolating switch of a changeover switch assembly, and therefore predetermined components in the second voltage circuit are supplied from the auxiliary battery. The predetermined components can all be components that are assigned to the second voltage circuit. Thus, the security of supply for the entire on-board network can be further increased.

According to a further embodiment, by means of a changeover switch of the changeover switch assembly, depending on the charge state of the main battery predetermined components connected to the DC-DC converter are supplied with electrical operating energy in the second voltage circuit from the auxiliary battery or from the main battery. The predetermined components can all be components that are assigned to the second voltage circuit. Thus, the security of supply for the entire on-board network can be further increased.

In accordance with another embodiment an at least 2-fold redundancy is guaranteed for the electrical operating supply of predetermined components in the second voltage circuit. The predetermined components can all be components that are assigned to the second voltage circuit. Thus, the security of supply for the entire on-board network can be further increased.

In accordance with another embodiment at least a 2-fold redundancy of the electrical operating supply is guaranteed for the components in the second voltage circuit which activate an electric parking lock or immobilizer and/or an electric parking brake. Malfunctions of an electric parking lock or immobilizer and/or an electric parking brake can therefore be prevented.

According to a further embodiment, in the event of an electrical overload of the second voltage circuit, by means of a fuse in combination with the changeover switch of the changeover switch assembly, predetermined components are protected from damage and supplied exclusively from the auxiliary battery. The predetermined components can all be components that are assigned to the second voltage circuit. Thus, the security of supply for the entire on-board network can be further increased.

According to a further embodiment the control unit for shifting gear between Drive/Neutral/Reverse and Park, controlled by the transmission control unit, is used as a warning system for the driver. It can thus be used to inform the driver of a malfunction.

According to a further embodiment, after a fault has occurred, components which activate an electric parking lock or immobilizer and/or an electric parking brake are disabled as required, in particular for towing the motor vehicle away. This can simplify the towing of a defective motor vehicle.

According to a further embodiment, on detecting a fault the main battery and/or the auxiliary battery is/are disconnected from the second voltage circuit. Thus, the security of supply for the entire on-board network can be further increased.

According to a further embodiment, the main battery and the auxiliary battery are separately charged using the isolating switches and isolating switches. Thus, the security of supply for the entire on-board network can be further increased.

According to a further embodiment, the auxiliary battery is disconnected from the second voltage circuit via the isolating switch, in particular upon detecting a maximum charging state. Thus, the security of supply for the entire on-board network can be further increased.

According to a further embodiment, the changeover switch assembly with the changeover switch and a system for overload protection/diagnostics and battery separation is controlled via an on-board network control unit. Thus, the security of supply for the entire on-board network can be further increased.

According to a further embodiment, a functional status of the auxiliary battery is detected via the auxiliary battery sensor (and/or a functional state of the main battery is detected via the main battery sensor), in particular to counteract malfunctions of the main battery and/or the auxiliary battery. Thus, the security of supply for the entire on-board network can be further increased.

According to a further embodiment, the functional status of the changeover switch assembly is verified on the basis of a function verification matrix. Thus, the security of supply for the entire on-board network can be further increased.

According to a further embodiment, via the hybrid controller, in particular integrated in the transmission control unit, hybrid functions are modified or disabled upon detection of a fault case. Thus, the security of supply for the entire on-board network can be further increased.

According to a further embodiment, at low vehicle speed (for example in city traffic) in the electrical driving modes, the main battery is disconnected from the second voltage circuit via the open isolating switch and the internal combustion engine is started. Thus, the security of supply for the entire on-board network can be further increased.

According to a further embodiment, during a startup phase the isolating switch is closed and the auxiliary battery is electrically conductively connected to the second voltage circuit, in particular to stabilize the voltage of the second voltage network. Thus, the security of supply for the entire on-board network can be further increased.

The invention also relates to a computer program product, an on-board electrical network and a motor vehicle having such an on-board electrical network.

The invention will now be explained on the basis of a drawing. Shown are:

FIG. 1 a schematic representation of an on-board electrical network of a motor vehicle with a supply from a main battery.

Figure 2:
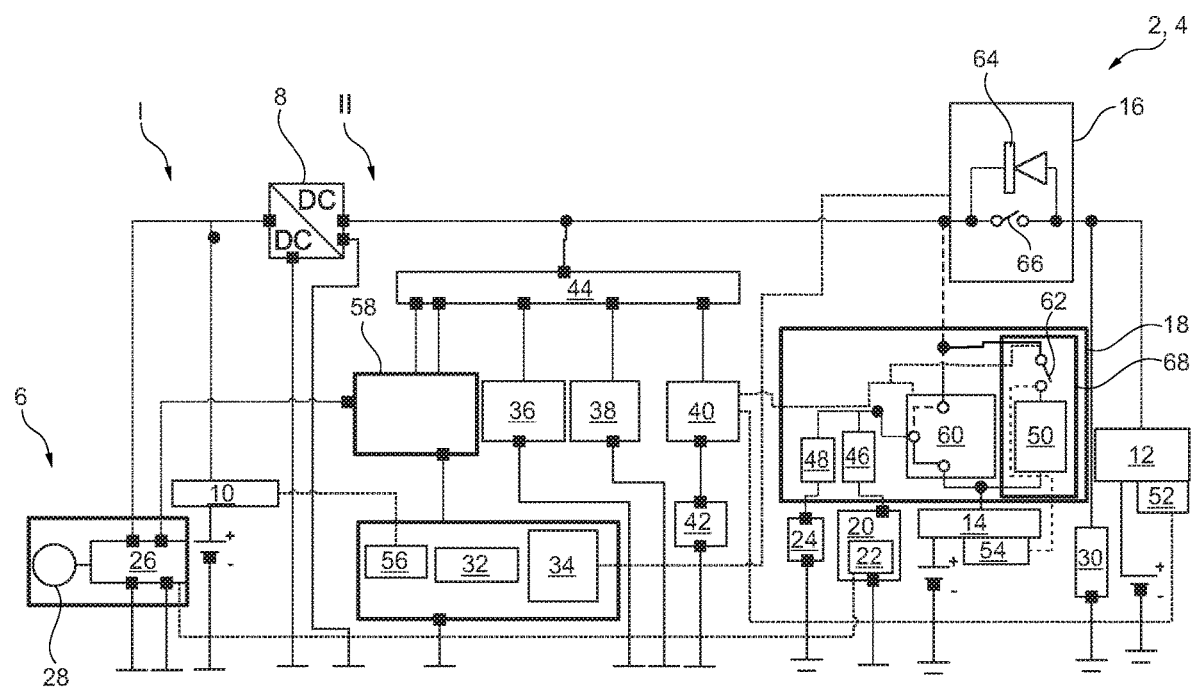

FIG. 2 the on-board electrical network shown in FIG. 1 with a supply from an auxiliary battery.

FIG. 3 a verification matrix.

In the following, reference is first made to FIG. 1.

FIG. 1 shows an on-board electrical network 4 of a motor vehicle 2, such as a car.

The motor vehicle 2 in the present exemplary embodiment has a powertrain 6. This powertrain 6 comprises all the components of the motor vehicle 2 that generate the power to drive the motor vehicle 2 and transfer it to the road.

In the present exemplary embodiment the powertrain 6 is designed as a mild hybrid powertrain. In other words, the motor vehicle 2 has a hybrid drive and is implemented as a hybrid electric vehicle. A hybrid drive is understood to mean a combination of an internal combustion engine (not shown) and an electric motor 28 for the motor vehicle drive.

The internal combustion engine in the present exemplary embodiment is a petrol engine. In normal operation the petrol engine is operated with an oxygen excess ($\lambda$>1). By way of deviation from this, the internal combustion engine can also be designed as a Diesel engine in lean-burn mode to increase the engine efficiency.

The electric motor 28 is an electrical rotary motor with a rotor and a stator, which can be operated both as a motor, i.e. as a partial traction motor, and as a generator for energy recuperation. The electric motor 28 can be designed, for example, as a DC motor, an AC motor, a synchronous motor, an asynchronous motor, a brushless electric motor or as a combination of these motor types.

The electric motor 28 of the powertrain 6 implemented as a mild hybrid powertrain delivers up to 15 kW per tonne of vehicle weight. In operation the electric motor 28 only assists the internal combustion engine to increase power. Purely electric driving is only possible to a limited extent, if at all.

The internal combustion engine and the electric motor 28 can work together in different ways: parallel (the internal combustion engine and the electric motor 28 act on the moving part at the same time), serially (only one of the motors acts directly on the moving part, while the other motor provides power which is converted and fed to the directly acting machine), or as a power-split hybrid.

The powertrain 6 implemented as a mild hybrid powertrain in the present exemplary embodiment is implemented as a parallel hybrid powertrain.

The on-board electrical network 4 has a first voltage circuit I and a second voltage circuit II. In operation, the first voltage circuit operates at a first operating voltage which is higher than a second operating voltage in the second voltage circuit II. In the present exemplary embodiment, the first operating voltage is 48 volts and the second operating voltage is 12 volts.

The first voltage circuit I is connected to the second voltage circuit II via a DC-to-DC converter 8. The DC-to-DC converter 8 in the present exemplary embodiment is designed for bidirectional voltage conversion, so for both stepping up and stepping down an electrical voltage.

The first voltage circuit I in the present exemplary embodiment comprises a battery 10 and an inverter 26.

The battery 10 in this exemplary embodiment is a lithium-ion battery which is electrically conductively connected to the DC-to-DC converter 8.

The inverter 26 is a bi-directional converter. In the generator mode of the electric motor 28 the inverter 26 converts an electrical AC voltage into an electrical DC voltage, and vice versa in the case of an application as an electric motor, converting an electrical DC voltage into an electrical alternating voltage. For this purpose the inverter 26 is electrically conductively connected on the input side to the electric motor 28. In addition, the inverter 26 is electrically conductively connected on the output side to the DC-to-DC converter 8 and is controlled or regulated by a hybrid controller 24 integrated into the transmission control unit 22.

The second voltage circuit II in the present exemplary embodiment comprises as essential components a main battery 12, an auxiliary battery 14, an isolating switch assembly 16 with a diode 64 and an isolating switch 66 for the main battery 12, a changeover switch assembly 18 with a changeover switch 60 and a system for overload protection/diagnostics and battery separation 68, shown with an isolating switch 62 for a changeover switch functional verification and for disconnecting the auxiliary battery 62 and a third fuse 50, a transmission control unit (TCM) 20, an integrated hybrid controller (HFM) 22 and a gear shift control unit (GSM) 24, which implement the engagement of the electrically operated parking lock/immobilizer in the transmission and thus secure the vehicle, as well as a starter 30. The isolating switch 62 and the fuse 50 implement the functions of opening and closing and a function for overload protection of the power line and as a function. The isolating switch 62 can also be implemented as a MOSFET system. The fuse 50, for example, can also be integrated in the isolating switch system.

The gear shift control unit 24 is actuated by the driver and thus expresses his/her desire to engage Drive/Neutral/Reverse or Park. The gear shift control unit 24 then sends an equivalent signal to the transmission control unit 20, which executes this command.

Other components are an ABS/EPB system 32, a powertrain control module (PCM) 34, an EPAS system 36, a gateway module (GWM) 38, an on-board control unit (BCM) 40, an infotainment system (IPC) 42, a fuse module 44, a first fuse 46, a second fuse 48, a third fuse 50, a main battery sensor 52 assigned to the main battery 12 for detecting a charge state of the main battery 12, an auxiliary battery sensor 54 assigned to the auxiliary battery 14 for detecting a charge state of the auxiliary battery 14, a battery management system (BECM) 56 and a power distribution unit 58.

In this exemplary embodiment the main battery 12 can be disconnected from the second voltage circuit II by means of the isolating switch 66 that can be activated by a control signal. Furthermore, in the present exemplary embodiment the isolating switch assembly 16 is assigned a diode 64 which is connected in parallel with the isolating switch 66. The diode 64 is connected in such a way that even if the isolating switch 66 is open, discharging the main battery 12 is for example possible, but charging the main battery 12 is not.

Disconnection of the second voltage circuit II from the main battery 12 and connection of the auxiliary battery 14 can be achieved without external control when an electrical voltage of the main battery 12 is less than or equal to a reference value. This function is implemented by the changeover switch 60, which ensures that the energy of the auxiliary battery 14 is always available when the main battery 12 has too low a charge. When the voltage is again equal to the reference value, the auxiliary battery 14 can be disconnected and the main battery 12 connected up again. FIG. 1 shows the position when the main battery 12 is connected up, FIG. 2 when the auxiliary battery 14 is connected.

In addition, in the present exemplary embodiment by means of the changeover switch 60 of the changeover switch assembly 18, which can be activated by a further control signal provided by an on-board control unit 40, with the changeover switch 62 open components of the motor vehicle 2 can be supplied with electrical power from either the main battery 12 or the auxiliary battery 14. In this exemplary embodiment these components are the transmission control unit 20 and/or the integrated hybrid controller 22 as well as the control unit for the gear shift 24, which implement the engagement of the electrically operated parking lock/immobilizer in the transmission so as to secure the motor vehicle 2.

Furthermore, in the present exemplary embodiment, by means of the isolating switch 62 of the changeover switch assembly 18 which can be controlled by a further control signal, components connected to the DC-to-DC converter 8 can be supplied with electrical power from the auxiliary battery 14, in particular during an engine startup operation or a malfunction of the main battery 12, as will be explained in detail later.

Furthermore, in the present exemplary embodiment, by means of the isolating switch 62 of the changeover switch assembly 18 which can be controlled by a further control signal provided e.g. by the on-board control unit 40, and the changeover switch 60, the auxiliary battery 14 can be disconnected from the voltage network II in order to keep the charging state appropriately high.

The starter 30 in this exemplary embodiment is a conventional 12V starter.

In operation, the on-board electrical network 4 can be operated in a starting mode, a combustion power mode or a charging mode. For this purpose, the components of the onboard network 4 comprise hardware and/or software components.

In the starting mode the powertrain control device 34 controls the isolating switch 66 so that the latter opens.

Additional reference will now be made to FIG. 2.

In addition, the changeover switch assembly 18 is controlled in such a way that an electrically conductive connection to the main battery 12 is formed and the transmission control unit 20 and/or the hybrid controller 22 are electrically conductively connected via the first fuse 46, and the gear shift control unit 24 is electrically conductively connected via the second fuse 48, to the auxiliary battery 14 and/or to the main battery 12.

The rest of the components on the other hand are electrically conductively connected to the DC-to-DC converter 8, wherein the third fuse 50 with the isolating switch 62 forms a by-pass around the changeover switch 60 of the changeover switch assembly 18.

With the isolating switch 66 open the auxiliary battery 14 and the DC-to-DC converter 8 support the second voltage circuit II.

The starter 30 can now start the internal combustion engine at low speeds, in a purely electric driving mode, in a safe operating mode without adversely affecting the stability of the voltage circuits I and II. In this case, the isolating switch 62 of the changeover switch assembly 18 is closed and the auxiliary battery 14 is connected to the DC-to-DC converter 8 to stabilize the second voltage circuit II.

In the combustion power mode, i.e. with the internal combustion engine running, the powertrain control device 34 controls the isolating switch 66 so that the latter closes.

Both the main battery 12 and the auxiliary battery 14 then support the on-board electrical network 4 together.

In the charging mode, either the auxiliary battery 14 alone (isolating switch 66 open/isolating switch 62 closed), the main battery 12 alone (isolating switch 66 closed/isolating switch 62 open) or both the main battery 12 and the auxiliary battery 14 together (isolating switch 66 closed/isolating switch 62 closed) can be charged.

On opening the isolating switch 62 the auxiliary battery can be disconnected from the second voltage network II, for example when the charging status of the auxiliary battery 14 is sufficiently high to keep it powered up for handling malfunctions of the onboard electrical network 4.

Thus, starting the internal combustion engine can be achieved following an electric driving mode at low speeds. At the same time, the disconnection of the electric motor 28 using the isolating switch 66 counteracts any voltage dropout while starting the engine via the auxiliary battery 14. Finally, after the starting process the main battery 12 and the auxiliary battery 14 can be charged with the DC-to-DC converter 8.

A failure of the main battery 12 and a failure of the auxiliary battery 14 in operation are detected by the on-board control unit 40 by evaluating measurement signals of the main battery sensor 52 and the auxiliary battery sensor 54.

In the event of a failure of the main battery 12 the changeover switch 60 creates an electrically conductive connection to the auxiliary battery 14, as shown in FIG. 2. In the event of fatal failure of the main battery 12, the defective main battery 12 can be isolated by opening the isolating switch 66 and closing the isolating switch 62.

With an open isolating switch 62, the transmission control unit 20 and/or the integrated hybrid controller 22 and the gear shift control unit 24 are supplied with electrical power from the auxiliary battery 14 and ensure the engagement of the electrically operated parking lock/immobilizer in the transmission and therefore the securing of the vehicle.

Likewise, the inverter 26, controlled by the integrated hybrid controller 24 of the transmission control unit 20, can be disconnected to conserve battery power.

Closing the isolating switch 62 will then cause the remaining components to be supplied with electrical power, which are provided both by the DC-to-DC converter 8 and the auxiliary battery 14. This is particularly important to maintain the power supply to the infotainment system 42 to illustrate customer information in the event of a fault.

Therefore, if a power circuit is then interrupted, the auxiliary battery 14 supplies electrical power to the transmission control unit 22 and the gear shift control unit 24, while the rest of the components are supplied with power by the DC-to-DC converter 8 via the second voltage circuit II.

In the event of a failure of the auxiliary battery 14, in operation the on-board control unit 40 detects this fault by evaluating measurement signals of the auxiliary battery sensor 54.

In response to this, the changeover switch 60 creates an electrically conductive connection to the main battery 12—see FIG. 1. In addition, by opening the isolating switch a defective auxiliary battery 14 can be electrically isolated from the rest of the on-board electrical network 4.

Then, the transmission control unit 20 and/or the hybrid controller 22 as well as the gear shift control unit 24 are supplied with electrical operating power from the main battery 12.

The inverter 26 and the remaining components are then supplied with electrical operating power, which are provided by the DC-to-DC converter 8 and the main battery 12 at the same time.

Therefore, if a power circuit is then interrupted, e.g. between DC-to-DC converter 8 and the isolating switch group 18, in a first case the main battery 12 supplies electrical operating power to the transmission control unit 20 and the gear shift control unit 24, while the rest of the components are supplied with operating power by the DC-to-DC converter 8 via the second voltage circuit II. In a second case, the main battery 12 alone will supply the transmission control unit 20 as well as the gear shift control unit 24 and the rest of the components with electrical operating power. In this case, the energy source of the DC-to-DC converter 8 is electrically isolated from all components.

This ensures at least a simple redundancy of electrical operating power for the transmission control device 20, hybrid control unit 24 and the gear shift control unit 24 which engages the parking lock/immobilizer function, and for all other control devices in the event of a fault. The fault is detected by the on-board system 4 and then resolved, without loss of function of the parking lock/immobilizer or the electric parking brake (EPB). The motor vehicle 2 can be secured against rolling away in the simple fault case, in some other fault cases even with 2-fold security, by the application of the immobilizer and the parking brake.

The integration of the control unit 24 for the gear shift in the redundancy system of the operating power also ensures that the control unit for the gear shift 24, in combination with the transmission control unit 20, can release the parking lock/immobilizer again in the transmission, and an electric parking brake in combination with the ABS/EPB system. This is necessary in order to enable the motor vehicle 2 to be towed.

In the event of an electrical overload of the second voltage circuit II, due to a short circuit for example, by means of the fuse 50 and in combination with the changeover switch 60 function of the changeover switch assembly 18 as described above, the transmission control device 20 and/or the integrated hybrid controller 22 as well as the gear shift control unit 24 are protected against damage and supplied exclusively from the auxiliary battery 14. In this case, the gear shift control unit 24, controlled by the transmission control unit 20, can be used as a warning system for the driver, because the other components including the infotainment system 42 must in this case be regarded as no longer functional.

Additional reference will now be made to FIG. 3.

A verification matrix 70 is shown, which is used to check the functional status of the changeover switch assembly 18.

A failure of the changeover switch 60, i.e. the changeover switch 60 does not switch/opens after neutral or switches to the wrong side of the battery, is detected in operation using the isolating switch 62 of the on-board control unit 40. Here the battery voltage of the auxiliary battery 14 is measured via the auxiliary battery sensor 54, and the battery voltage of the main battery 12 via the main battery sensor 52. The transmission control unit 20 detects the voltage present on the transmission control unit 20. The on-board control unit 40 now switches at least three of the four possible combined switching states (changeover switch 60=main battery 12 and isolating switch 62 open or closed, or changeover switch 60=auxiliary battery 14 and isolating switch 62 open or closed), as shown in FIG. 3. In each switching state the voltages at these 3 measuring points are compared with a voltage matrix stored in the software and confirmed.

Here the measured electrical voltage must match the expected voltage value, wherein V1 can be the voltage value of the auxiliary battery 14 and V2 the voltage value of the main battery 12.

If no confirmation is possible, a fault is assumed to exist in the changeover switch assembly 18.

In case of a fault it may be the case that no electrical operating power is available for the operation of the transmission control unit 20 and/or the hybrid controller 22 and the controller for the gear shift 24.

An electric parking brake of the ABS/EPB system 32 is then activated by the on-board control unit 40 to immobilize the motor vehicle 2.

A failure of the main battery 12 and of the auxiliary battery 14 in operation are detected by the on-board control unit 40 by evaluating measurement signals of the main battery sensor 52 and the auxiliary battery sensor 54.

Then the transmission control unit 20 and/or the integrated hybrid controller 22 and the gear shift control unit 24 and the inverter 26, as well as the rest of the components, are supplied with electrical operating power which is provided by the DC-to-DC converter 8 via the second voltage circuit II.

If a load reduction occurs of the transmission control unit 20 and/or the integrated hybrid controller 22 and the gear shift control unit 24, these control units have no electrical power.

The remaining components are supplied with electrical power which is provided by the DC-to-DC converter 8 via the second voltage circuit II.

An electric parking brake of the ABS/EPB system 32 is then activated by the on-board control unit 40 to immobilize the motor vehicle 2 (the onboard control unit 40 detects that no electric current is being supplied to the transmission control device 20 and/or the integrated hybrid controller 22 or the gear shift control unit 24, e.g. via a CAN bus).

This allows unexpected vehicle movements when the vehicle is stationary to be avoided in the event of a fault, since a redundancy of the operating power supply is provided for an electrically operated parking lock/immobilizer, and also for an electric parking brake (EPB).

A redundancy of the operational power supply is achieved in the second voltage circuit II by means of the main battery 12 and the auxiliary battery 14, since the supply of electrical operating power using the DC-to-DC converter 8 alone is not sufficiently stable. Thus, in particular, redundancy of the operating power supply can be achieved for the transmission control unit 20 and/or the integrated hybrid controller 22 and the gear shift control unit 24 and for the ABS/EPB system 32 at the same time.

LIST OF REFERENCE NUMERALS 2 motor vehicle
4 on-board electrical network
6 powertrain
8 DC-to-DC converter
10 battery
12 main battery
14 auxiliary battery
16 isolating switch assembly
18 changeover switch assembly
20 transmission control unit
22 hybrid controller integrated in the transmission control unit
24 control unit for shifting gear between Drive/Neutral/Reverse and Park
(Shift-by-Wire and Park-by-Wire control unit)
26 inverter
28 electric motor
30 starter
32 ABS/EPB system
34 powertrain control unit
36 EPAS system
38 gateway module
40 onboard electrical network controller
42 infotainment system
44 fuse assembly
46 fuse
48 fuse
50 fuse
52 main battery sensor
54 auxiliary battery sensor
56 battery management system
58 power distribution unit
60 changeover switch 62 isolating switch for changeover switch diagnosis and for separation of
the auxiliary battery from the on-board network
64 diode
66 main battery isolating switch
68 system for overload protection/diagnostics and battery separation
I first voltage circuit
II second voltage circuit

The invention claimed is:

1. A method for operating an on-board electrical network (4) of a motor vehicle (2), the method comprising:
providing a first voltage circuit (I); and
providing a second voltage circuit (II), the first voltage circuit (I) having a first operating voltage which is higher than a second operating voltage in the second voltage circuit (II), the first voltage circuit (I) being connected to the second voltage circuit (II) via a DC-DC converter (8), and the first voltage circuit (I) having a battery (10) and the second voltage circuit (II) having a main battery (12),
wherein the second voltage circuit (II) has a third auxiliary battery (14),
wherein a changeover switch assembly (18) is configured to supply components of the motor vehicle (2) with electrical operating power from the main battery (12) and/or the auxiliary battery (14), and
wherein the main battery (12) is configured to be disconnected from the second voltage circuit (II) by an isolating switch (66) during a startup mode.

2. The method according to claim 1, wherein one of the components is a transmission control unit (20) and/or a hybrid integrated control (22) integrated in a transmission control unit.

3. The method according to claim 1, wherein one of the components is a control unit for shifting gear between Drive/Neutral/Reverse and Park (24).

4. The method according to claim 1, wherein one of the components is an ABS/EPB system (32).

5. The method according to claim 1, wherein an isolating switch (62) of the changeover switch assembly (18) is configured to supply predetermined components in the second voltage circuit (II) connected to the DC-DC converter (8) with electrical operating power from the auxiliary battery (14).

6. The method according to claim 1, wherein a changeover switch (60) of the changeover switch assembly (18) is configured to supply, depending on a charge state of the main battery (12), predetermined components connected to the DC-DC converter (8) with electrical operating power in the second voltage circuit (II) from the auxiliary battery (14) or from the main battery (12).

7. The method according to claim 1, wherein at least a simple redundancy of an electrical operating supply for predetermined components in the second voltage circuit (II) is guaranteed.

8. The method according to claim 1, wherein at least a simple redundancy of an electrical operating supply is guaranteed for the components in the second voltage circuit (II), which activate an electric parking lock or parking immobilizer and/or an electric parking brake.

9. The method according to claim 1, wherein in an event of an electrical overload of the second voltage circuit (II), by a fuse (50) in combination with a changeover switch (60) of the changeover switch assembly (18), predetermined components are protected from damage and supplied exclusively from the auxiliary battery (14).

10. The method according to claim 9, wherein a control unit for shifting gear between Drive/Neutral/Reverse and Park (24), controlled by a transmission control unit 20, is used as a warning system for a driver.

11. The method according to claim 1, wherein after a fault occurs, components which activate an electric parking lock or parking immobilizer and/or an electric parking brake are disabled as required for towing the motor vehicle away (2).

12. The method according to claim 1, wherein upon detecting a fault, the main battery (12) and/or the auxiliary battery (14) are disconnected from the second voltage circuit (II).

13. The method according to claim 1, wherein the main battery (12) and the auxiliary battery (14) are separately charged using the isolating switch (66) and the isolating switch (62) of the changeover switch assembly (18).

14. The method according to claim 1, wherein the auxiliary battery (14) is disconnected from the second voltage circuit (II) via the isolating switch (62) of the changeover switch assembly (18) upon detecting a maximum charging state.

15. The method according to claim 1, wherein the changeover switch assembly (18) with a changeover switch (60) and a system for overload protection/diagnostics and battery separation (68) is controlled via an on-board control unit (40).

16. The method according to claim 1, wherein a functional state of the auxiliary battery (14) is detected via an auxiliary battery sensor (54) and/or a functional state of the main battery (12) is detected via a main battery sensor (52) to counteract malfunctions of the main battery (12) and/or the auxiliary battery (14).

17. The method according to claim 15, wherein a functional status of the changeover switch assembly (18) is verified using a verification matrix (70).

18. The method according to claim 1, wherein via a hybrid controller (24) integrated in a transmission control unit (20), hybrid functions are modified or disabled upon detection of a fault case.

19. The method according to claim 1, wherein at low vehicle speed in an electric driving mode, the main battery (12) is disconnected from the second voltage circuit (II) via opening the isolating switch (66) and an internal combustion engine (2) is started.

20. The method according to claim 19, wherein during a startup phase, the isolating switch (62) is closed and the auxiliary battery (14) is electrically conductively connected to the second voltage circuit (II) to stabilize a voltage of the second voltage circuit (II).

21. A motor vehicle, comprising
an on-board electrical network comprising a first voltage circuit and a second voltage circuit,
wherein the first voltage circuit comprises a first operating voltage and the second voltage circuit comprises a second operating voltage, wherein the first operating voltage is higher than the second operating voltage,
wherein the first voltage circuit is connected to the second voltage circuit by a DC-DC converter,
wherein the first voltage circuit comprises a battery and the second voltage circuit comprises a main battery,
wherein the second voltage circuit (II) has a third auxiliary battery (14),
wherein a changeover switch assembly (18) is configured to supply components of the motor vehicle (2) with electrical operating power from the main battery (12) and/or the auxiliary battery (14), and wherein the main battery (12) is configured to be disconnected from the second voltage circuit (II) by an isolating switch (66) during a startup mode.

\* \* \* \* \*